United States Patent [19]

Kawazoe et al.

[11] Patent Number: 4,790,063
[45] Date of Patent: Dec. 13, 1988

[54] METHOD AND APPARATUS FOR FABRICATING ARMATURE OF FLAT MOTOR

[75] Inventors: Hiroshi Kawazoe; Tokuhito Hamane, both of Hirakata, Japan

[73] Assignee: Matsushita Electric Industrial Co., Ltd., Osaka, Japan

[21] Appl. No.: 930,759

[22] Filed: Nov. 14, 1986

[30] Foreign Application Priority Data

Nov. 25, 1985 [JP] Japan .............................. 60-264034

[51] Int. Cl.⁴ ........................................ H01R 43/06
[52] U.S. Cl. ..................................... 29/597; 29/605; 29/732; 29/735; 140/92.1
[58] Field of Search ................. 29/732, 733, 735, 596, 29/597, 598, 605; 140/92.1; 310/268

[56] References Cited

U.S. PATENT DOCUMENTS

| | | | |
|---|---|---|---|
| 3,668,449 | 6/1972 | King | 29/597 |
| 3,863,336 | 2/1975 | Noto et al. | 29/597 |
| 3,955,273 | 5/1976 | Morinaga et al. | 29/597 |

FOREIGN PATENT DOCUMENTS

| | | | |
|---|---|---|---|
| 196858 | 12/1982 | Japan | 310/268 |
| 130753 | 8/1983 | Japan | 29/598 |

Primary Examiner—P. W. Echols
Attorney, Agent, or Firm—Stevens, Davis, Miller & Mosher

[57] ABSTRACT

A continuous coil material is formed on flat unit coils alternating with coupling parts corresponding to coil receivers of a commutator. The coupling parts are coupled to the coil receivers of the commutator, and the unit coils are mounted on the unit coil positioning parts arranged around the commutator, alternately with each other in a predetermined positional order. The coupling parts and the receiving parts coupled to each other are electrically connected, and the unit coils overlapped in position around the commutator are connected at contact parts thereof, thereby forming an armature for a flat motor.

5 Claims, 9 Drawing Sheets

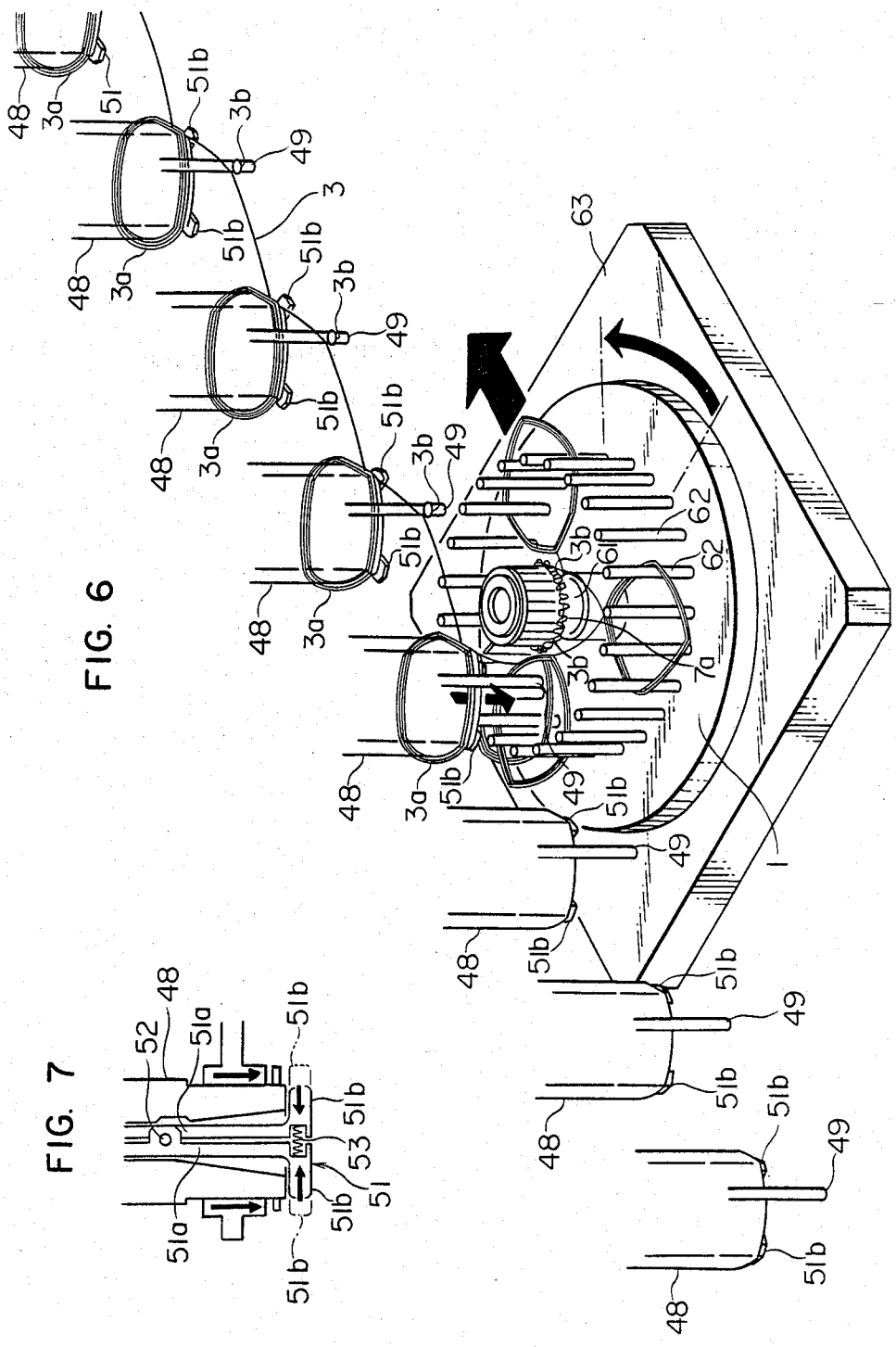

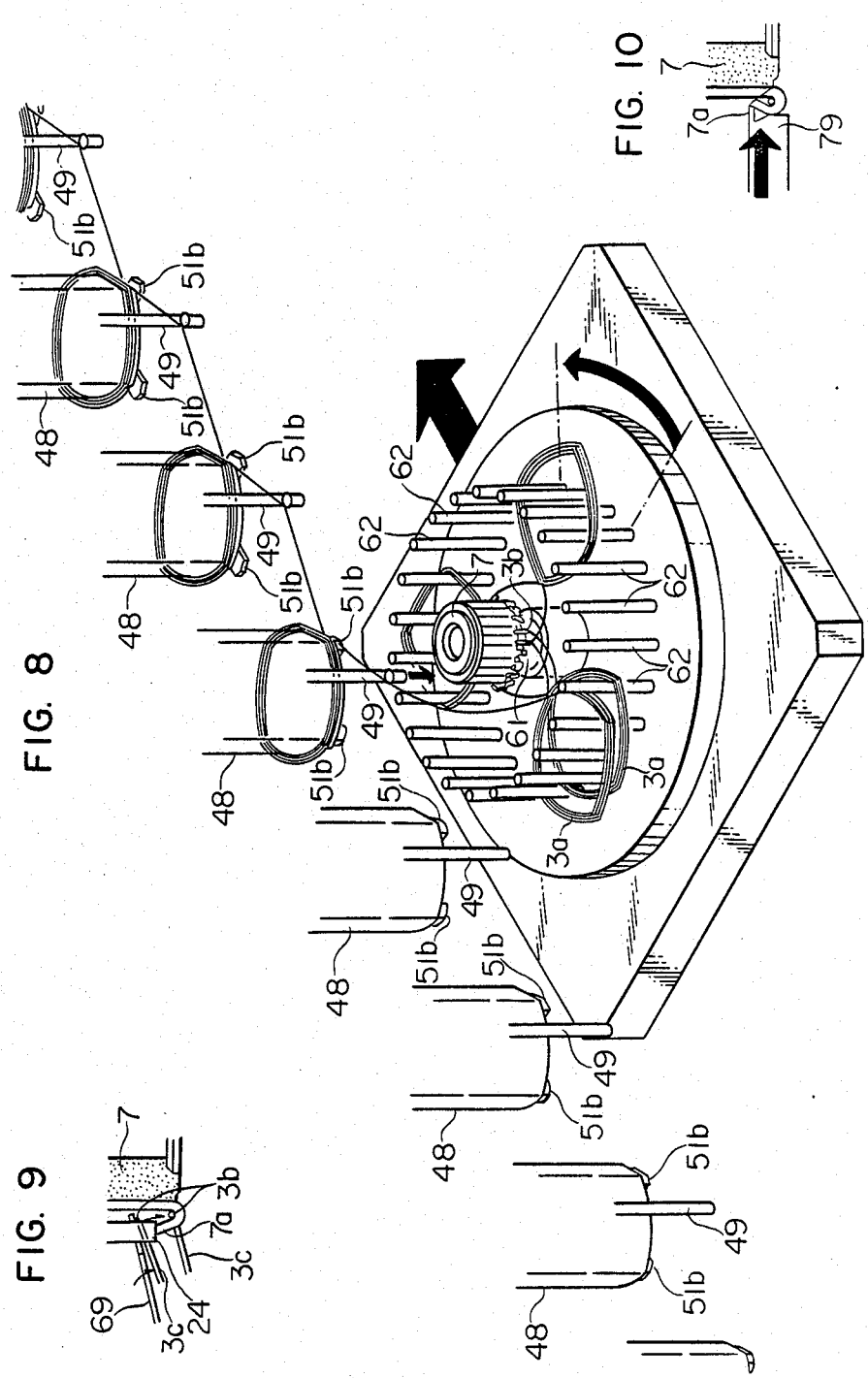

METHOD AND APPARATUS FOR FABRICATING ARMATURE OF FLAT MOTOR

BACKGROUND OF THE INVENTION

1. Field of the Invention

The present invention relates to a method and apparatus for fabricating the armature of a flat motor used in a limited space for office equipment such as duplicator or electric equipment of automobiles, etc.

2. Description of the Prior Art

An armature of this type is so constructed that flat unit coils are arranged while being overlapped and slightly displaced along the circumferential direction in an appropriate sequence around a commutator, and the lead wires at the ends of each unit coil are electrically connected by being coupled in a predetermined sequence to each winding coupler of the commutator. The unit coils arranged as above, on the other hand, are connected to each other at the contact parts thereof so that a disc member is formed by the unit coils around the commutator.

A conventional method of forming such an armature is disclosed in JP-A No. 58-130753. This method comprises the steps of winding a wire material on each unit coil-forming rest arranged on an intermittently-rotating turntable; causing the winding material to dwell stably; processing the starting and trailing ends of the wire material by holding, cutting, inserting and bending; transferring the unit coils formed and held on the unit coil-forming rest to predetermined unit coil-positioning parts opposedly arranged around the commutator holder; and connecting the starting and trailing ends of the unit coils thus transferred, with predetermined coil receivers of the commutator.

In a method disclosed in JP-A No. 60-5759, on the other hand, each time a unit coil is formed by winding a wire material on a frame, the unit coil is transferred to a predetermined unit coil positioning part arranged around the commutator, and at the same time, the part midway of the wire material extending from the unit coil thus transferred is connected to a coil receiver of the commutator before the next unit coil is formed. This process of work is repeated.

In the above-mentioned method with a turntable, the necessary processes of work are performed simultaneously by a multiplicity of stations corresponding to the stop positions of the unit coil-forming rests on the turntable. In view of he fact that many troublesome work processes such as holding, cutting, inserting and bending the starting and trailing ends of the wire material are involved, however, a trouble is liable to occur, thereby making the method unsuitable for high-speed operation.

In the method where each time a unit coil is formed, it is mounted, the lead wires of each unit coil are coupled or electrically connected to the commutator at a coupler set between the unit coil-forming parts of the wire materials without cutting the wire material or any process associated therewith. In spite of the comparatively long time required for the work of winding the wire material forming the unit coils, such work is performed for the unit coils, one by one, in the intervals of coupling or electrical connection to the commutator, resulting in a low productivity.

SUMMARY OF THE INVENTION

According to the present invention, there is provided a method and apparatus for fabricating the armature of a flat motor in which, in order to obviate the abovementioned problems, by use of a continuous coil material with flat unit coils and couplers associated with coil receivers of the commutator formed alternately in a successive manner, the coupling of the couplers to the coil receivers of the commutator is alternated with the mounting of the unit coils on the unit coil-positioning parts in a predetermined positional order, the receivers and the couplers thus coupled to each other are electrically connected, and the unit coils overlapped in position around the commutator are coupled to each other at the contact parts thereof.

The coil couplers of the commutator are properly made up of hooks, and the couplers of the continuous coil material of connecting rings adapted to fit on the hooks.

The unit coils may be coupled to each other by thermal fusion of an adhesive electrically heated at the overlapped portions.

In the above-mentioned configuration, by using a continuous coil mateial thus preformed, the armature can be formed totally regardless of the winding work, or in parallel to the winding as desired. In any event, the process of forming the armature with the continuous coil material need not be suspended during the forming of the continuous coil material.

Further, the continuous coil material is used without cutting between unit coils or any various incidental work thereto by the processes of arrangement of the unit coils around the commutator utilizing the unit coil positioning parts, the electrical connection of the ends of the unit coils to the commutator corresponding to the unit coil arrangement mentioned above by coupling of the couplers to the coil receivers of the commutator and the coupling of the unit coils overlapped around the commutator at the contact parts thereof, thus making it possible to form the armature quickly and accurately.

According to a second aspect of the present invention, flat unit coils are formed alternately with couplers corresponding to coil receivers of the commutator to produce a continuous coil material. In parallel to this process, the couplers are coupled to the respective coil receivers of the commutator alternately with the process of mounting the unit coils at the unit coil positioning parts arranged around the commutator in a predetermined positional sequence, while at the same time connecting the couplers electrically to the coil receivers thus coupled, and the respective unit coils overlapped in position around the commutator are connected to each other at the contact parts thereof, thereby forming the armature of a flat motor.

According to still another aspect of the present invention, there is provided an apparatus for fabricating the armature of a flat motor by the above-mentioned method, comprising means for forming a continuous coil material with flat coil successively provided at predetermined intervals, means for transferring the continuous coil material on coil forming means onto intermediate coil holding means, an armature forming rest including a commutator holder and unit coil positioning parts arranged therearound which is adapted to be moved along the continuous coil material holder of the intermediate coil holding means and to rotate around the commutator holder, control means for moving and rotating the armature forming rest in such a manner that the unit coil positioning parts on the armature forming rest and the coil receivers of the commutator held on the armature forming rest are opposedly arranged to the unit coils of the continuous coil material held on the intermediate coil holding means and the couplers therebetween in a predetermined positional sequence, means for mounting the opposed unit coils on the unit coil positioning parts sequentially, and means for coupling the opposed couplers to the coil receivers sequentially.

The coil forming means preferably includes a coil forming rest with at least a predetermined number of unit coil flat winding parts on one side which is adapted to be reversible in the directions of winding the wire material and crossing the coils, and a wire winding head opposed to the unit coil flat winding parts on the coil forming rest for forming a continuous coil material by sequentially winding a continuous wire thereon.

The intermediate coil holding means, on the other hand, preferably includes a unit coil holder corresponding to the unit coil falt winding part on the coil forming rest on one side thereof and adapted to operate reversibly between the direction of receiving the continuous coil material opposed to the coil forming rest and the direction of supplying the continuous coil material to the armature forming rest.

According to this invention, a continuous coil material is formed in which flat unit coils are alternated with couplers corresponding to the coil receivers of the communicator. In parallel to the forming of the continuous coil material, the unit coils are arranged around the communicator by utilizing the unit coil positioning parts, the ends of the respective unit coils are electrically connected to the commutator at positions corresponding to the unit coil arrangement by coupling the couplers to the coil receivers of the commutator, and the unit coils overlapped around the commutator are coupled at the contact parts thereof thereby forming the armature without any incidental work such as cutting off the unit coils of the continuous coil material.

Furthermore, according to this invention, the intermediate coil holding means is interposed between the coil forming means for forming a continuous coil material and such means as the armature forming rest for forming the armature by use of the continuous coil material, and receives the continuous coil material formed at the coil forming means each time of transfer to enable the continuous coil material to be formed continuously by the coil forming means only with the transfer process of the continuous coil material inbetween, while at the same time supplying the continuous coil material thus transferred for forming the armature, thereby proceeding to form an armature with a continuous coil material in parallel to the forming of the continuous coil material.

The armature forming rest is adapted to move and rotate in such a manner that the unit coils and the couplers of the continuous coil material held in the intermediate coil holding means are opposed in a predetermined positional sequence against the unit coil positioning parts around the commutator held and the coil receivers of the commutator. The unit coils of the continuous coil material are thus arranged around the commutator continuously and sequentially with the process of coupling the couplers to the corresponding coil receivers of the commutator, the process of connecting the couplers to the coil receivers thus coupled electrically, and the process of coupling the unit coils overlapped around the commutator at the respective contact parts to each other, thus completing an armature.

BRIEF DESCRIPTION OF THE DRAWINGS

FIG. 6 is a perspective view partially showing the manner in which the continuous coil material is set on the commutator on the armature forming rest from the intermediate coil holding means.

FIG. 7 is a partial sectional view showing the manner in which the unit coils are transferred as shown in FIG. 6.

FIG. 8 is a perspective view partially showing the manner in which the continuous coil material is set at a time point one step advanced from FIG. 6.

FIG. 9 is a partial sectional view showing the manner in which the connecting ring in FIG. 8 is transferred.

FIG. 10 is a partial sectional view showing the manner in which the commutator hook is coupled after transfer of the connecting ring shown in FIG. 7.

DESCRIPTION OF THE PREFERRED EMBODIMENTS

Figure 1:
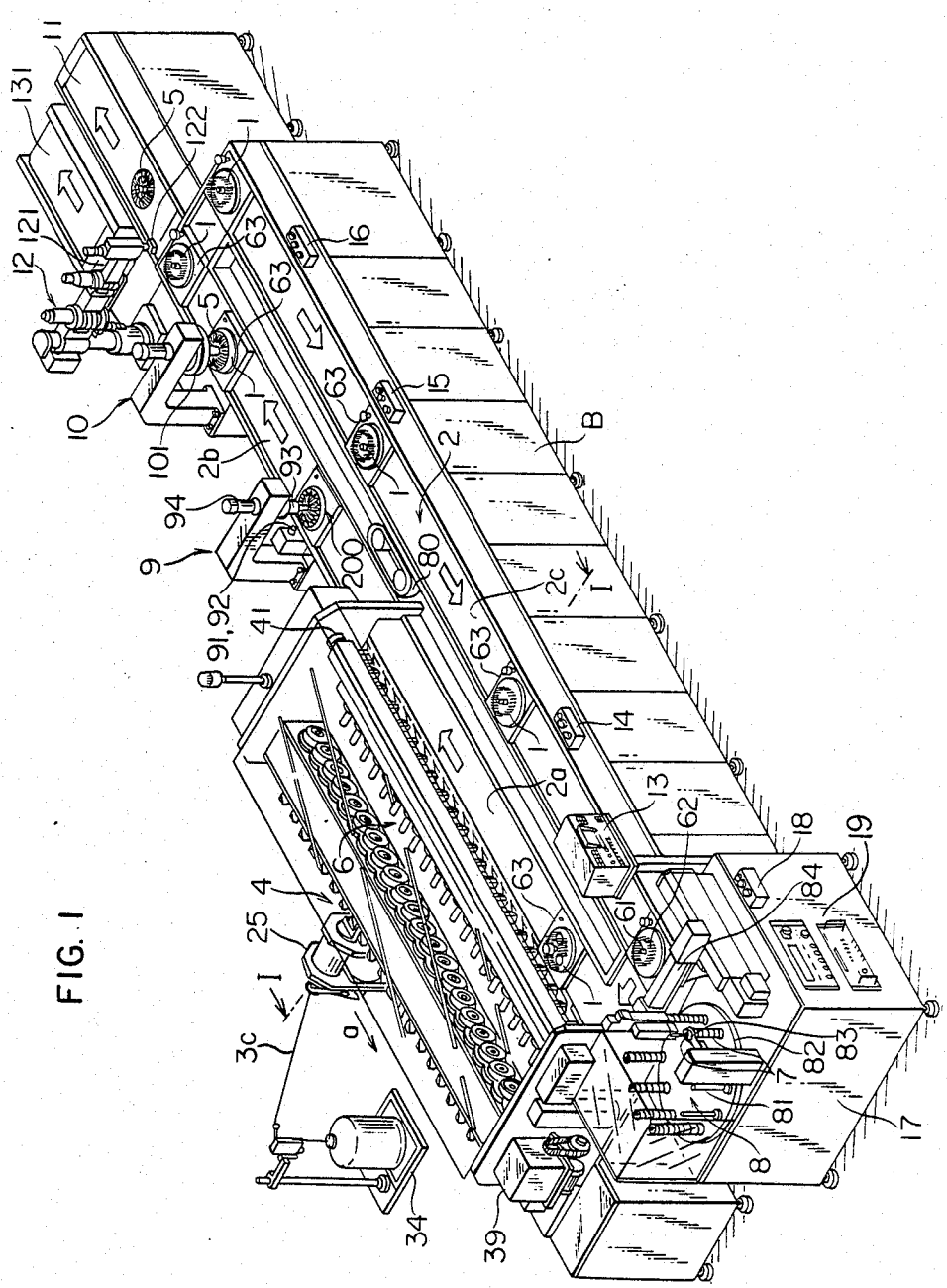
FIG. 1 is a perspective view generally showing an apparatus according to an embodiment of the present invention.
Figure 3:
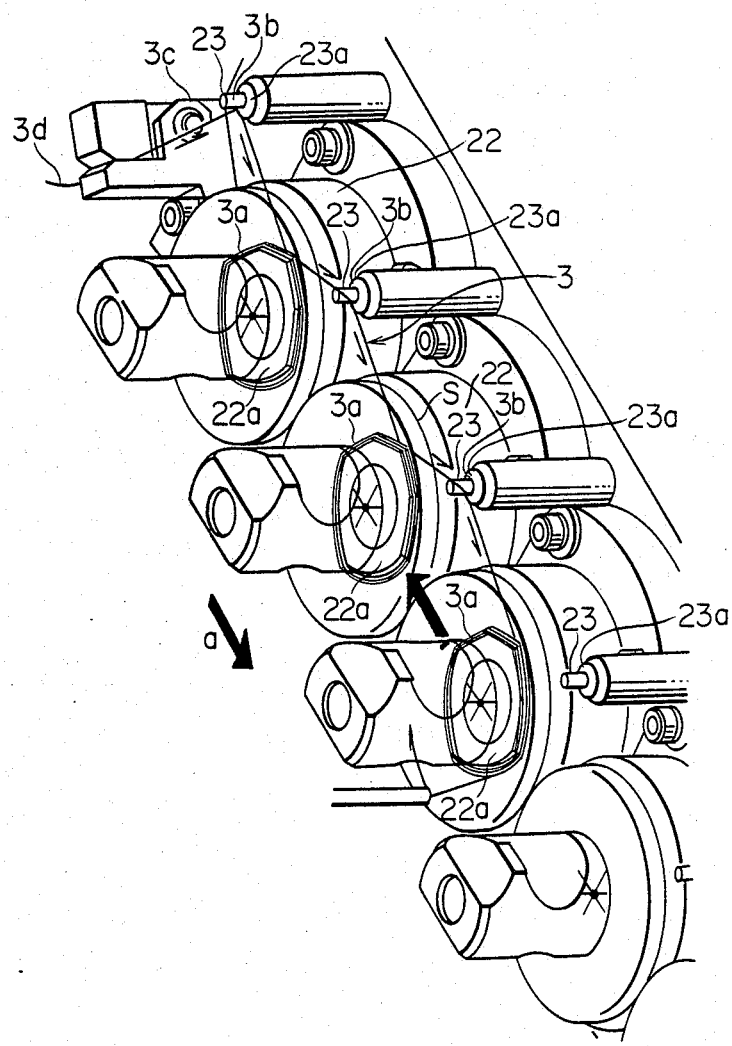
FIG. 3 is a perspective view showing a part of coil forming means in the process of forming a continuous coil material.
Figure 4:
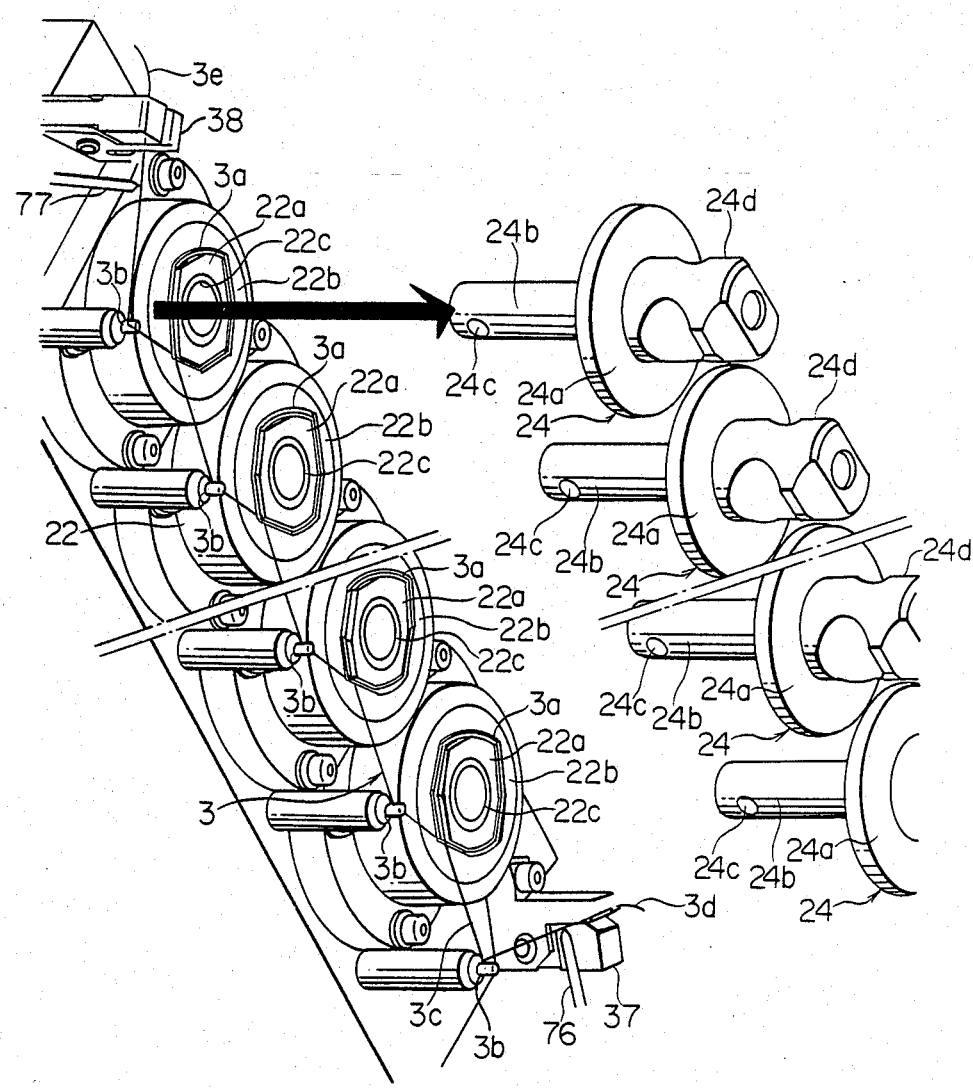
FIG. 4 is a perspective view showing a part of a winding guide demounted, which permits transfer of the continuous coil material on the coil forming means.

A general view of an apparatus embodying the present invention is shown in FIG. 1. A rectangularly annular line 2 is arranged in a plane for forming armatures on a horizontal table B. The longitudinal half part on one side of this line 2 includes an arrangement of coil forming means 4 for forming a continuous coil material 3 as shown in FIGS. 3 and 4, and an intermediate coil holding means 6 for receiving the continuous coil material formed and supplying it for forming armatures 5 on armature forming rests 1. On the side of that end of the line 2 which includes the coil forming means 4 and the intermediate coil holding means 6 arranged side by side, there is provided commutator supply means 8 for supplying commutators making up the armature 5 by connecting with the continuous coil material 3 to the armature forming rests 1 on the line 2.

A finish line 2b following the coil mounting line 2a with an arrangement of the coil forming means 4 and the intermediate coil holding means 6 of the line 2 includes an arrangement of fusing means 9 for electrically connecting the commutator 7 and the predetermined parts of the continuous coil material 3 set thereon, and coil coupling means 10 for coupling the continuous coil materials 3 set on the commutator 7 at the overlapped contact parts thereof. The end of the line 2 at which the coil coupling means 10 is installed is connected with a delivery line 11 for derivering the formed armatures 5, and armature transfer means 12 for transferring the armatures 5 from the armature forming rests 1 of the line 2 to the line 11 between the lines 2 and 11.

A data setting indication box 13 for the whole apparatus, an individual operation controller 14 for the coil forming means 4 and the intermediate coil holding means 6, an individual controller 15 for the fusing means 9, and an individual operation controller 16 for the coil coupling means 10 are disposed in front of the armature forming rest return line 2c parallel to the coil mounting line 2a and the finish line 2b of the line 2. Also, an individual operation controller 18 for the commutator supply means 8 is disposed in front of the installation base 17 of the commutator supply means 8. A basic data setting unit 19 is located under the front side of the installation base 17.

Figure 2:
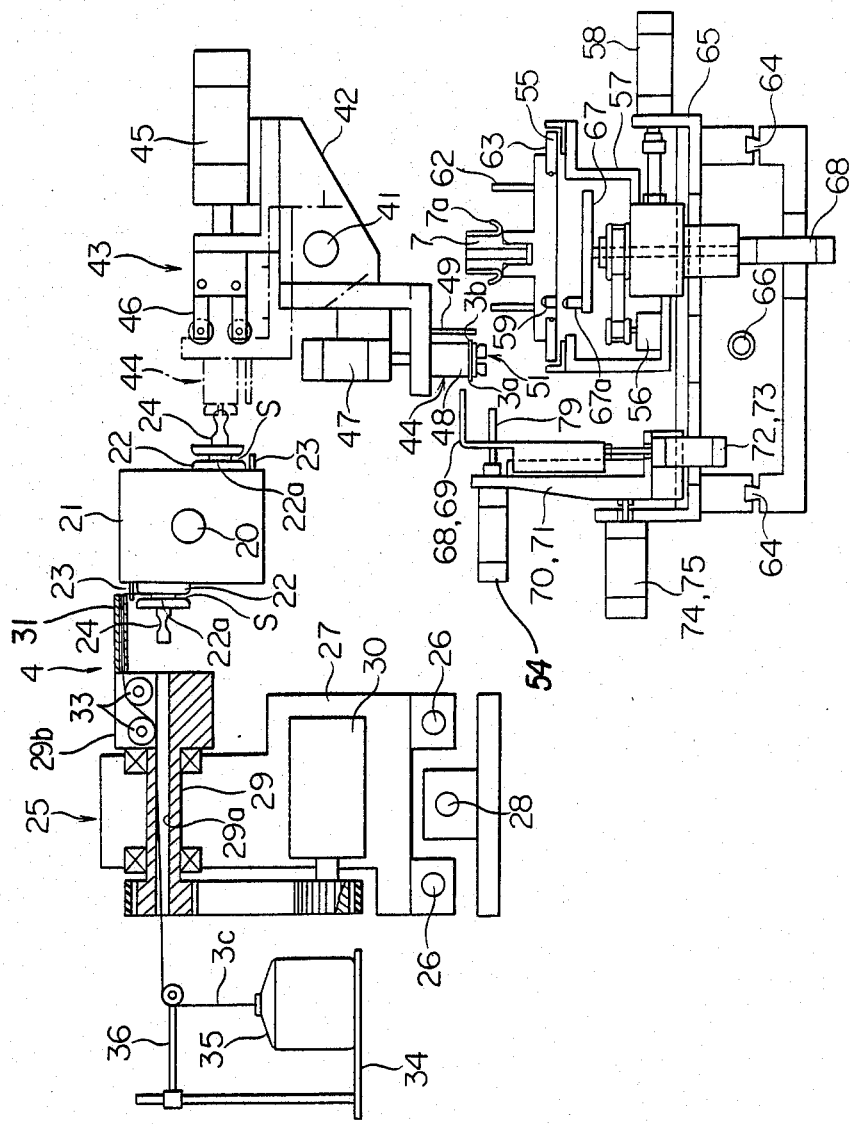
FIG. 2 is a sectional view taken along the line I—I in FIG. 1.
Figure 5:
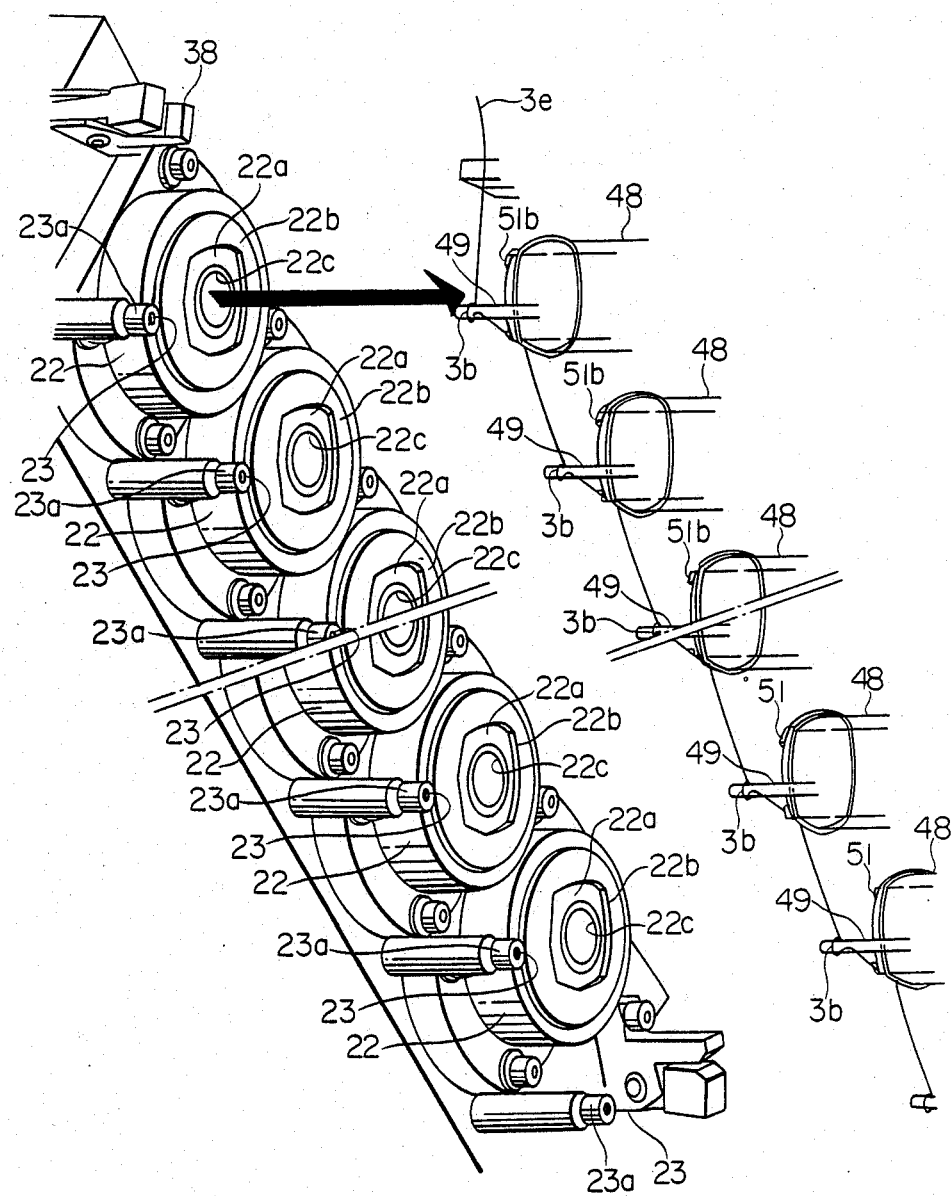
FIG. 5 is a perspective view partially showing the manner in which the continuous coil material is transferred from the coil forming means to the intermediate coil holding means.

The continuous coil material, as shown in FIGS. 3, 4 and 5, comprises flat unit coils 3a successively alternating with the connecting rings 3b adapted to couple with the hooks 7a (FIG. 6) making up the coil receivers formed around the outer periphery of the commutator 7. The unit coils 3a and the connecting rings 3b in a number required for forming an armature 5 are formed separately as a unit. The coil forming means 4 for forming this continuous coil material 3, as shown in FIGS. 1 and 2, includes a cylindrical rotary member 21 horizontally disposed to reciprocate within a range of 180° around the horizontal axis 20. The rotary member 21 has a unit coil forming rest 22 and a connecting ring forming shaft 23 arranged horizontally on the sides thereof. The unit coil forming rest 22 has a drum 22a for winding the wire material 3c flatly on the front end thereof, which drum 22a is projected with a small misalignment with the coil demounting cylinder 22b therearound. A coil winding guide 24 is replaceably mounted at the center of the drum 22a in the manner shown in FIGS. 3 and 4.

The coil winding guide 24 has a guide flange 24a of a large diameter supplied to the projected end of the drum 22a, and mounting shaft 24b projected at the central part of the guide flange 24a is demountably fitted into the central mounting hole 22c of the drum 22a, while guiding the winding of the wire material 3c on the drum 22a by a clearance S between the unit coil forming rest 22 and the guide flange 24a, thus winding the wire material 3c in flat form. The wire winding guide 24 thus mounted is stabilized in a demountable condition by elastic engagement between the engaging recess 24c formed on the side of the forward end of the mounting shaft 24b and a click stopper (not shown) in the mounting hole 22c. The winding guide 24 further has a clamped shaft 24d formed on the back thereof in the form of a stopper clamped for mounting or demounting on the unit coil forming rest 22. The connecting ring forming shaft 23 is also projected with a misalignment with the connecting ring demounting cylinder 23a therearound to receive the winding of the wire material 3c at the projected part thereof.

The coil forming means 4 also includes a wire material winding mechanism 25 opposed to the rotary member 21 on the other side of the line 2. The wire material winding mechanism 25, as shown in FIG. 2, includes a carriage 27 movable longitudinally of the rotary member 21 by being guided by the horizontal guide 26, which carriage 27 is adapted for reciprocal motion by a screw shaft 28. The carriage 27 has a wire winding rotary member 29 held at the same height as the axis of the drum 22a. The winding rotary member 29 is driven by transmission from a motor 30, and has a wire winding tube 31 at an eccentric position of the end thereof opposed to the rotary member 21. Also, a through hole 29a for passing the wire material 3c is formed at the central part of the member 29, and a couple of guide rollers 33 are arranged within a split slot 29b formed at the end of the through hole 29a on the side of the winding tube 31.

A supply table for wire material 3c as shown in FIGS. 1 and 2 is provided on the back of the wire material winding mechanism 25. The supply table carries a container 35 of the wire material 3c, and the wire material 3c withdrawn from the container 35 is supplied through a swing arm 36 to the wire winding rotary member 29, and through the through hole 29a and the guide roller 33 passed to the wire winding tube 31. When the wire winding rotary member 29 rotates with an end of the wire material 3c fastened to a part thereof, which wire material 3c is opposed to the unit coil forming rest 22 and pulled out of the wire winding tube 31, then the wire winding tube 31 is rotated around the unit coil forming rest 22, so that the wire material 3c is fitted in the clearance S corresponding to the forward end of the winding tube 31, and proceeds to wind on the drum 22a while being supplied. As a result, a flat unit coil is wound in a thickness limited to the clearance S on the outer periphery of the drum 22a and similar to the outer periphery of the drum 22a.

In view of the fact that the wire winding rotary member 29 is not correctly opposed to the connecting ring forming shaft 23, the winding of the wire material 3c on the connecting ring forming shaft 23 cannot be performed by the rotating operation of the wire winding tube 31, but by the movement of the wire winding tube 31 in one way at a position lower than the connecting ring forming shaft 23 and in the other way at a position higher than the connecting ring forming shaft 23, followed by the movement in one way at a further lower position. As an alternative, the wire winding rotary member 29 is aligned axially with the connecting ring forming shaft 23, so that the wire material 3c is wound on the connecting ring forming shaft 23 by rotating the wire winding tube 31. By this winding operation of the wire material 3c, the connecting ring 3b is formed.

The surface of the rotary member 21 on which the unit coil forming rest 22 and the connecting ring forming shaft 23 are arranged carries the clamp means 37 and 38 associated with the starting end 3d and the trailing end 3e of the wire material 3c positioned outside of the ends of the above-mentioned surface of the rotary member 21. (FIGS. 3, 4 and 5)

The clamp means 37, 38 are adapted to operate in appropriate timing by drive means not shown including a solenoid or a cylinder actuated under fluid pressure.

Also, means for cutting the wire material 3c may be located conveniently immediately outside of the position of the clamp means 38 of the rotary member 21 or in proximity to the winding tube 31. The rotary member 21 is reciprocally driven within the range of 180° by a motor reduction gear unit 39. (FIG. 1)

The intermediate coil holding means 6 includes a rotary member 42 reciprocated within the range of 90° by a drive mechanism not shown around the horizontal axis 41 as seen from FIGS. 1 and 2. The rotary member 42 is mounted horizontally on the line 2 side of the coil forming means 4, and includes a winding guide mounting-demounting mechanism 43 opposed to the rotary member 21 at one rotating position and a continuous coil material holding mechanism 44 opposed to the rotary member 21 at the other rotating position. The winding guide mounting-demounting mechanism 43, on the other hand, includes an air cylinder 45 fixed on the rotary member 42 and a clamper 46 coupled thereto. A plurality of clampers 46 in the same number as the unit coil forming rests 22 arranged on the rotary member 21 are provided. When the clamper 46 is advanced toward the rotary member 21 by the air cylinder 45, the clamped shaft 24d of the winding guide 24 mounted on each unit coil forming rest 22 is clamped, while when the clamper 46 is retreated by the air cylinder 45, the winding guide 24 is pulled off from the unit coil forming rest 22 via the clamped shaft 24d.

The continuous coil material holding mechanism 44 includes an air cylinder 47 fixed on the rotary member 42 and a connecting ring holding shaft 49 and a unit coil holding member 48 coupled thereto. A plurality of unit coil holding members 48 are provided in the same number as the unit coil forming rests 22 on the rotary members 21 corresponding to the connecting shaft forming shafts 23. Each unit coil holding member 48, as shown in FIG. 7, is provided with a coil catch 51 for preventing the unit coil 3a held from separating. The coil catch 51 is such that a couple of arms 51a secured by being inserted into the unit coil holding member 48 causes the catch 51b at the lower end to expand slightly from the four corners of the lower surface of the unit coil holding member 48 in the manner shown by a phantom line in FIG. 7 under the expanding force of a spring 53 interposed between the arms 51, thus preventing the unit coil 3a from separating. The coil catch 51 is connected to drive means such as solenoid not shown, so that when the unit coil holding member 48 receives the unit coil 3a. In supplying the unit coil 3a, on the other hand, the catch 51b is adapted to retreat in the manner shown by solid line in FIG. 7.

The coil demounting cylinder 22b outside of the drum 22a and the connecting ring demounting cylinder 23a outside of the connecting ring forming shaft 23 provided as coil transfer means for relocating the unit coil 3a and the connecting ring 3b on each unit coil forming rest 22 and each connecting ring forming shaft 23 on the rotary member 21 onto the unit coil holding member 48 on the holding shaft 49 and the connecting ring holding shaft 49 are projected from the unit coil forming rest 22 and the connecting ring forming shaft 23 respectively with the unit coil holding member 48 and the connecting ring holding shaft 49 on the rotary member 42 opposed to each other on the unit coil forming rest 22 and the connecting ring forming shaft 23. The projection of the coil demounting cylinder 22b and the connecting ring demounting cylinder 23a extends to the unit coil holding member 48 and the connecting ring holding shaft 49 respectively, with the result that the unit coil 3a is transferred to the unit coil holding member 48, and the connecting ring 3b to the connecting ring holding shaft 49.

The armature forming rest 1, as shown in FIGS. 2, 6 and 8, has a commutator holder 61 at the central part thereof, around which unit coil positioning pins 62 are arranged thereby to hold the forming rest 1 on a moving pallet 63 rotatably, which forming rest 1 is thus placed on the line by the moving pallet 63.

The coil mounting line 2a included in the line 2 is provided with a carriage 65 guided by a rail 64 for movement along the coil mounting line 2a as seen from FIG. 2. The carriage 65 is adapted for reciprocal motion on the coil mounting line 2a by the rotation of the screw shaft 66, and includes a loading station 55 for receiving the armature forming rest 1 with the moving pallet 63, a pulse motor 56 for rotating the armature forming rest 1 by a predetermined angle and a sub-carriage 57 on which the loading station 55 and the pulse motor 56 are assembled. The sub-carriage 57 is adapted to be moved in the direction parpendicular to the coil mounting line 2a by the air cylinder 58. The pulse motor 56 is adapted to drive the armature forming rest 1 through a drive plate 67 with a drive pin 67a to be fitted into a receiving hole 59. The drive plate 67 is adapted to engage and disengage the armature forming rest 1 by the vertical motion thereof through the cylinder 68, so that when the drive plate 67 is disengaged from the rest 1, the receiving from and delivery to the coil mounting line 2a of the armature forming rest 1 are made possible, while when the drive plate 67 is engaged with the rest 1, the armature forming rest 1 is capable of being driven. The carriage 65 is also provided with forks 68, 69 for scratching off the unit coils 3a on the unit coil holding member 48 or the connecting ring 3b on the connecting ring holding shaft 49 down onto the armature forming rest as and at the time point when the armature forming rest 1 is moved into sequentially opposed relations with the unit coil holding member 48 and the connecting ring holding shaft 49 rotated downward.

The forks 68, 69 are supported on slides 70, 71 movable toward and away from the coil mounting line 2a on the carriage 65, by energizing the vertical-motion air cylinders 72, 73, so that the forks 68, 69 are movable between an acting position where the unit coil 3a and the connecting ring 3b may be scratched down by the forward and reverse feed of the air cylinders 74, 75 and a non-acting position where the movement of the carriage 65 does not interfere with the unit coil holding member 48 or the connecting ring holding shaft 49. Also, the air cylinders 72, 73 causes the operation of scratching down the unit coil 3a on the unit coil holding member 48 and the connecting ring 3b on the connecting ring holding shaft 49 in one way, and restoring in the other way to the condition before the scratching operation. The carriage 65 further has a pressure tool 79 driven forward or reversely by the cylinder 54 for pressuring and bending the hook 7a coupled with the connecting ring 3b.

The finish line 2b is also provided with the carriage 65. In view of the fact that the conditions for movement of the armature forming rest 1 on the coil mounting line 2a are different, however, the carriage 65 is adapted to be driven reciprocally by a screw shaft 66 separate from the armature forming line 2a. Also, the carriage 65 for the finish line 2b has no forks 68, 69.

A crossing conveyor 80 is arranged to prevent a crossing failure of the armature forming rest 1 which might be caused by separate driving of the carriage 65 between the coil mounting line 2a and the finish line 2b. (FIG. 1)

The armature forming rest return line 2c, the only function of which is to transport the armature forming rest 1 together with the moving pallet 63, is made up of a simple belt conveyor.

The commutator supply means 8 includes an intermittently-driven turntable 82 with a plurality of vertical shafts 81 arranged on the circumference thereof for fittingly holding a multiplicity of commutators 7 in a layered state, a take-up arm 83 for taking up the commutators 7 on the vertical shafts 81 stationary in position one by one, and robot arm 84 for picking up the commutators 7 taken up by the take-up arm 83 and mounting them on the commutator holding member 61 on the armature forming rest 1 positioned at the trailing end of the armature forming rest return line 2c. The commutators 7 are mounted on the vertical shafts 81 manually or by automatic means.

Figure 12:
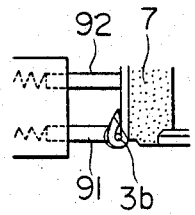
FIG. 12 is a partial sectional view showing the manner in which the connecting ring and the commutator hook are subjected to a fusing process for an armature assembly shown in FIG. 11.

The fusing means 9 includes a pressure tool 91 and a fusing energization tool 92. The pressure tool 91 functions such that the hook 7a coupled with the connecting ring 3b is further pressed to bond the connecting ring 3b against the commutator 7 on the armature forming rest 1 that has moved along the finish line 2b and stopped as shown in FIG. 12. The fusing energization tool 92, on the other hand, generates heat by energization in cooperation with the pressure tool 91 from between two points holding the parts of the commutator 7 coupled with the connecting ring 3b, thus accomplishing the coupling and electrical connection with the commutator 7 by fusion of the outer adhesive layer of the connecting ring 3b. (FIG. 12) Also, a holder 93 for holding the commutator 7 from above is coupled to the vertical-motion air cylinder 94.

Figure 13:
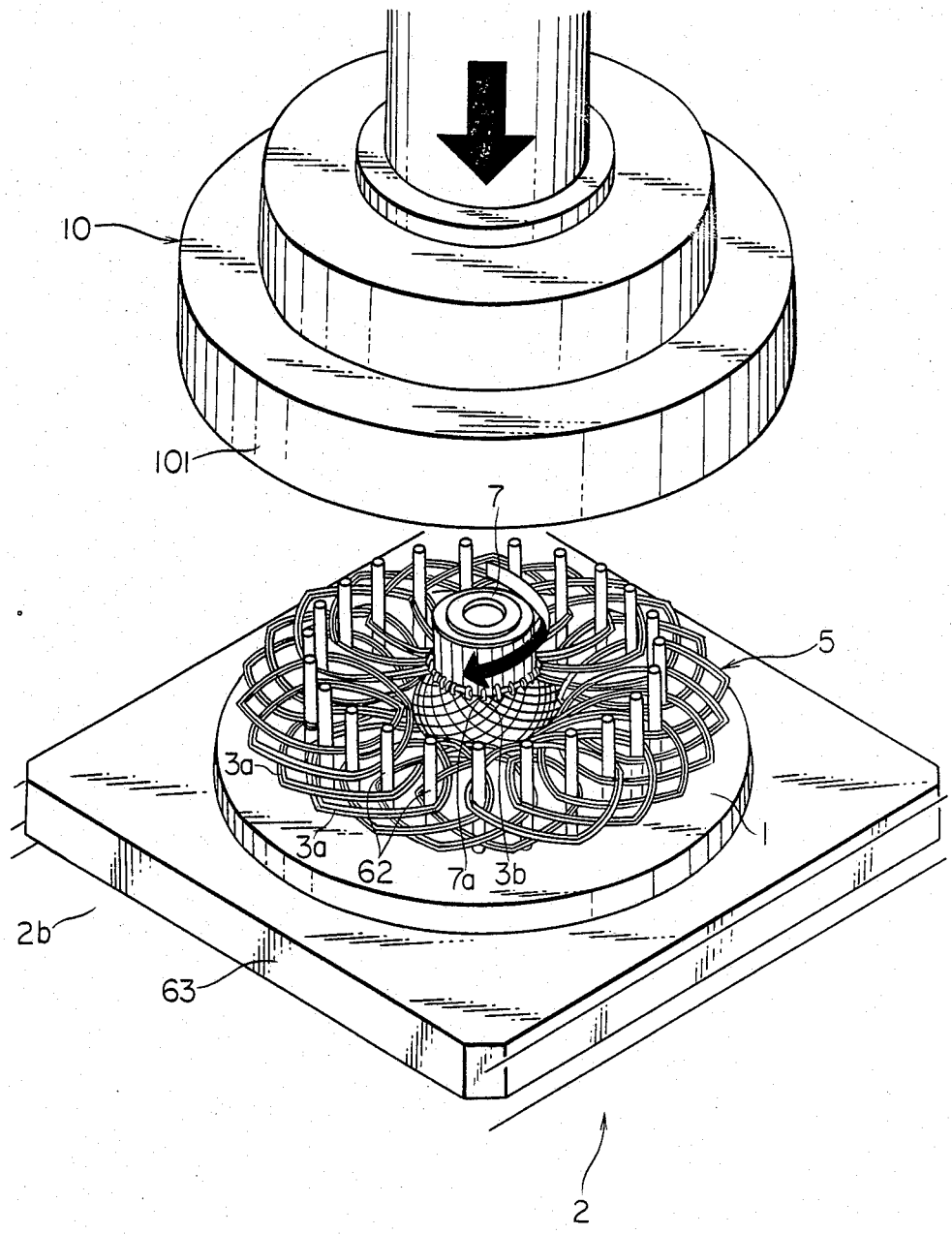
FIG. 13 is a perspective view partially showing the manner in which the unit coils are coupled on the armature form shown in FIG. 12.

The coil coupling means 10, as shown in FIGS. 1 and 13, includes a bonding energization board 101 for pressing the unit coils 3a which are set and overlapped one on another around the commutator 7 on the armature forming rest 1 that has arrived by being moved on the finish line 2b and stopped at the opposed position, and for energizing the continuous coil material 3 between the hook 7a finally coupled with the connecting ring 3b of the commutator 7 and two hooks 7a sequentially coupled with the connecting ring 3b.

The armature transfer means 12 has a chuck 122 for grasping the commutator 7 at the forward end of the robot arm 121.

In parallel to the delivery line 11, a rejected item delivery line 131 is provided for rejecting a faulty item disconnected or shorted that has been detected by energization or the like in the process of forming the armature 5.

In the series of operation, the armature forming rests 1 in the number required for sequential smooth performance of work are arranged at proper intervals on the line 2. Each of the armature forming rests 1, when it reaches the left trailing end in FIG. 1 of the armature forming rest return line 2c, is forced to wait until the armature forming work ends on the coil mounting line 2a, and in the meantime, the commutator 7 is supplied from the commutator supply means 8 and held at the commutator holding member 61.

On the side of the coil mounting line 2a, the wire material winding mechanism 25, while intermittently moving in the direction of the arrow in FIGS. 1 and 3, causes the starting end 3d of the wire material 3c to clamp with the clamp means 37 on the rotary member 21 when the mechanism 25 faces the clamp means 37. When the mechanism 25 faces the connecting ring forming shaft 23, on the other hand, the wire material is wound by a turn on it, while when the unit coil forming rest 22 is faced, the required number of turns of the wire material 3c are wound on the drum 22a. In this way, as shown in FIG. 3, the connecting rings 3b and the unit coils 3a are formed alternately with a continuous wire material 3c. After the required number of connecting rings 3b and unit coils 3a are formed, the wire material winding mechanism 25 clamps the trailing end 3e of the wire material 3c on the clamp means 38 as shown in FIG. 4 thereby to end the forming of the continuous coil material. The energization terminals 76, 77 are connected to the starting end 3d and the trailing end 3e to energize the continuous coil material 3 with the contact parts of the wire material 3c integrated by fusion bonding of the adhesive layers thereof for keeping them in shape. The rotary member 21 which receives this continuous wire material 3 formed on one side thereof reverses by 180 degrees, so that the surface formed with the continuous wire material 3 faces the intermediate coil holding means 6 while the surface thereof not formed with the continuous wire material 3 faces the wire material winding mechanism 25.

On the surface of the rotary member 21 not formed with any continuous wire material 3, the work of forming the continuous wire material begins to be performed immediately after the wire material winding mechanism 25 is faced in a similar manner.

On the surface of the rotary member 21 formed with the continuous wire material 3, which faces the clamper 46 of the intermediate coil holding means 6, on the other hand, the coil winding guide 24 is removed as shown in FIG. 4 by the clamper 46 immediately after the facing. Then, the intermediate coil holding means 6 keeps the clamper 46, which has removed and holds the coil winding guide 24, away from the position facing the rotary member 42, while at the same bringing the continuous coil holding mechanism 44 to the position facing the rotary member 21. In the process, the continuous coil holding mechanism 44 causes the unit coil holding member 48 and the connecting ring holding shaft 49 to be placed in opposed relations with the unit coil forming rest 22 and the connecting ring forming shaft 23 on the surface of the rotary member 21 formed with the continuous coil material 3, so that the continuous wire material 3 is transferred by the advance of the coil demounting cylinder and the connecting ring demounting cylinder 49a.

The intermediate coil holding means 6 with the continuous coil material holding mechanism 44 receiving the continuous coil material 4 transferred thereto is such that the clamper 46 holding the wire winding guide 24 faces on the rotary member 21, while the holder of the continuous coil material 3 is positioned down to face the coil mounting line 2a.

Under this condition, the clamper 46 is advanced, and the winding guide 24 is returned by being mounted on each unit coil forming rest 22 on the rotary member 21.

By this time, the carriage 65 has returned to the original position on the left side of FIG. 1 on the coil mounting line 2a, and waiting at the trailing end of the armature forming rest return line 2c, receives and carries the armature forming rest 1 holding the commutator 7 that has been supplied thereto.

The armature forming rest 1 placed on the carriage 65 on the coil mounting line 2a is moved by the air cylinder 58 to a position where it is capable of receiving the continuous coil material 3 held by the intermediate coil holding means 6. In the process, the commutator 7 on the armature forming rest 1 at the origin of the coil mounting line 2a has one of the hooks 7a on the outer periphery thereof facing the first connecting ring holding shaft 49 as counted from the left side of FIG. 1 on the intermediate coil holding means 6. The connecting ring 3b is transferred between the connecting ring holding shaft 49 and the hook 7a faced thereby in the manner shown by FIG. 9, thus causing the hook 7a to engage the connecting ring 3b. The hook 7a is then deformed under pressure by the pressure tool 79 on the carriage 65 to stop the connecting ring 3b in the manner shown in FIG. 10, thus ending the connection of the connecting ring 3b to the hook 7a.

After this connection, the carriage 65 is slightly moved and the armature forming rest 1 slightly rotated into a position where the first unit coil holding member 48 as counted from the left side in FIG. 1 on the intermediate coil holding means 6 is faced by the unit coil positioning pin 62 to receive the unit coil 3a held in the member 48. The unit coil 3a is transferred by the form 68 in the manner shown in FIG. 7 between the unit coil 3a and the unit coil positioning pin 62 thus faced, thus mounting the unit coil 3a on the unit coil positioning pin 62.

The armature forming rest 1 causes the connecting ring holding shaft 49 and the unit coil holding member 48 on the intermediate coil holding means 6 to face the hook 7a in a predetermined position of the commutator 7 and the unit coil positioning pin 62 in a predetermined position of the armature forming rest 1 sequentially from the left side in FIG. 1, while connecting and mounting the connecting rings 3b and unit coils 3a in the predetermined order of positions on the hooks 7a of the commutators 7 and the unit coil positioning pins 62 around the commutator 7.

According to the embodiment under consideration, there are provided 23 hooks 7a of the commutator 7 and also 23 unit coil positioning pins 62. Four adjacent unit coil positioning pins 62 cover a unit coil 3a, which is held in position by the unit coil positioning pins 62 at the end thereof. If the connecting rings 3b and the unit coils 3a are coupled to and mounted on these hooks 7a and the unit coil positioning pins 62 at intervals of eight units as shown in FIGS. 6 and 8, the first to third connecting rings 3b are arranged in a substantially equidistant arrangement of three along the circumferential direction, while the fourth and subsequent connecting rings 3b are displaced relative to adjacent rings 3b by one connecting positioning pin 62 each in a similar equidistant arrangement of three. As a result, the fourth and subsequent unit coils 3a overlap each other slightly displaced circumferentially in the sequential manner shown in FIGS. 6 and 8.

Figure 11:
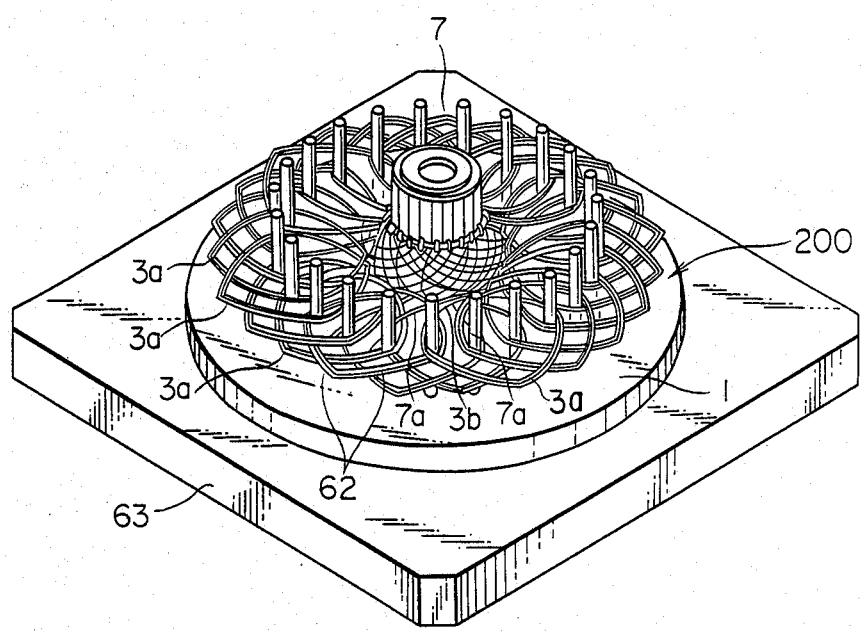
FIG. 11 is a perspective view partially showing the manner in which the continuous coil material is completely set on the commutator.

When the transfer is completed this way from the intermediate coil holding means 6 onto the armature forming rest 1, the unit coils 3a come to be arranged in a predetermined sequence around the commutator 7 on the armature forming rest 1 as seen from FIG. 11, and the connecting rings 3b therebetween are coupled to the respective hooks 7a of the commutator 7 thereby to make up a form of armature assembly 200.

The armature assembly 200 is transferred to the finish line 2b for each armature forming rest 1, and after being subjected to the fusing and coil coupling processes at the fusing means 9 and the coil coupling means 10 respectively, is completed as an armature 5.

When the armature assembly 200 is completed, the intermediate coil holding means 6 is restored to a position on the rotary member 21 side of the coil forming means, and in position to receive the next continuous coil material 3 which is transferred thereto after being formed on the rotary member 21 during the forming of the armature assembly 200, in order to supply the same material 3 for forming the next armature assembly 200.

The same operation is repeated to form a plurality of armatures 5 sequentially.

It will thus be understood from the foregoing description that according to one aspect of the present invention, an armature is fabricated by use of a continuous coil material having a required number of unit coils and commutator coupling parts without regard to or in parallel to the forming of the particular continuous coil material, and therefore, the coil-winding work is capable of being performed continuously without suspending the work of fabricating the armature. The work of forming the armature with the continuous coil material is performed in such a simple and rapid manner that the unit coils and the coupling parts of the continuous coil material are opposed to the unit coil positioning parts around the commutator and the coil receivers of the commutator in a predetermined positional order to receive the transfer, and are set in one step into an armature assembly without cutting the continuous coil material, while electrically connecting the coupling parts and the coil receivers and coupling the unit coils overlapped around the commutator. Thus, the working efficiency and yield are improved.

According to another aspect of the invention, a required number of unit coils and coupling parts for coupling them to the commutator are formed for producing an armature in a single step in the form of a continuous coil material easy to handle and involving only a small number of working processes. As a result, the armature is easily formed within a short time without appreciable trouble. Also, the armature is formed from the continuous coil material in such a simple and rapid manner that the unit coils and the coupling parts of the continuous coil material are placed in opposed relationship with the unit coil positioning parts around the commutator and the coil receiving parts of the commutator in a predetermined positional order in order to receive the transfer. The continuous coil material is set in a single step on the commutator into a form of an armature without being cut, while the coupling parts and the coil receivers are electrically connected and the unit coils overlapped around the commutator are coupled. In particular, the unique operation of forming the unit coils and the operation of forming the armature with them are conducted in parallel to each other, with the result that armatures are formed continuously without any time lag which otherwise might be caused by waiting for the forming of the continuous coil material, thereby improving the working efficiency remarkably.

Further, according to the present invention, the continuous coil material formed in the coil forming means is transferred to and held in the intermediate coil holding means before being supplied for forming an armature. Therefore, once the continuous coil material is transferred to the intermediate coil holding means, the coil forming means is in a position to proceed with the operation of forming the next continuous coil material immediately without regard to the progress of the operation in which it is used to form the armature, thereby making it possible to perform an otherwise time-consuming operation of forming the continuous coil material without any waste time. Also, the unit coils and the couplers or coupling parts in between of the continuous coil material for forming an armature may be mounted on and coupled to the unit coil positioning parts around the commutator and the coil receivers of the commutator sequentially and independently with regard to the operation of forming the continuous coil material within a time period of forming a single continuous coil material. In this way, the fine and detailed armature-forming work is performed accurately without any trouble.

We claim:

1. A method of fabricating an armature of a flat motor, comprising the steps of:
   (a) forming a continuous coil material having a plurality of flat unit coils and a plurality of coupling parts disposed alternately and successively with each other;
   (b) receiving and holding said continuous coil material in a holding means;
   (c) carrying said continuous coil material in a rotating manner to an armature forming rest;
   (d) transferring pairs each comprising one of said unit coils and one of said coupling parts onto the armature forming rest successively in accordance with movement and rotation of the armature forming rest;
   (e) coupling said coupling parts to a plurality of unit coil receiving parts of a commutator;
   (f) mounting said unit coils on a plurality of unit coil positioning parts arranged around the commutator such that said unit coils are overlapped relative to each other and positioned around the commutator, said coupling of said coupling parts and said mounting of said unit coils being performed alternately and in a predetermined positional order;
   (g) electrically connecting said coupling parts to said unit coil receiving parts of the commutator; and
   (h) coupling said unit coils with each other at each overlapped position thereof.

2. A method according to claim 1, further comprising providing said unit coil receiving parts of the commutator with a hook and providing said coupling parts of said coil material with a coupling ring for engagement with said hook.

3. A method of fabricating an armature of a flat motor, comprising: (a) first forming a continuous coil material having a plurality of flat unit coils and a plurality of coupling parts disposed alternately and successively with each other; and (b) thereafter (i) receiving and holding said continuous coil material in a holding means; (ii) carrying said continuous coil material in a rotating manner to an armature forming rest; (iii) transferring pairs each comprising one of said unit coils and one of said coupling parts onto the armature forming rest successively in accordance with movement and rotation of the armature forming rest; (iv) coupling said coupling parts to a plurality of unit coil receiving parts of a commutator; (v) mounting said unit coils on a plurality of unit coil positioning parts arranged around the commutator such that said unit coils are overlapped relative to each other and positioned around the commutator, said coupling of said coupling parts and said mounting of said unit coils being performed alternately and in a predetermined positional order; (vi) electrically connecting said coupling parts to said unit coil receiving parts of the commutator; and (vii) coupling said unit coils with each other at each overlapped position thereof, wherein said first step (a) and second steps (b) (i)-(vii) are performed such that another continuous coil material is being formed in step (a) while steps (b) (i)-(vii) are being performed.

4. An apparatus for fabricating an armature of a flat motor, comprising:
   (a) a coil forming means for forming a continuous coil material having a plurality of flat unit coils and a plurality of coupling parts disposed alternately and successively with each other at predetermined distance intervals;
   (b) a plurality of armature forming rests each having a commutator holding part and a plurality of unit coil positioning parts, each of said armature forming rests being rotatable;
   (c) an intermediate coil holding means rotatably disposed in parallel with said coil forming means and said armature forming rests, respectively, for (i) receiving said continuous coil material from said coil forming means, (ii) holding and rotatably carrying said continuous coil material at a position opposite to one of said armature forming rests, and (iii) transferring pairs each comprising one of said unit coils and one of said coupling parts to said one of said armature forming rests in accordance with movement and rotation of said one of said armature forming rests;
   (d) means for mounting said unit coils on said plurality of unit coil positioning parts arranged around a commutator; and
   (e) means for coupling said coupling parts to a plurality of unit coil receiving parts of the commutator.

5. An apparatus according to claim 4, wherein said coil forming means includes a coil forming table having a plurality of flat unit coil winding parts disposed in alignment with each other on at least one side thereof, and disposed to rotate in reverse directions comprising a coil winding direction and a coil bridging direction, and a plurality of winding heads disposed opposite to said flat unit coil winding parts of said coil forming table and disposed to rotate in said coil winding direction, said winding heads for winding a continuous wire material to said unit coil winding parts to form said continuous coil material.

* * * * *